3,268,566
PROCESS FOR THE PRODUCTION OF
TETRAMETHYL TITANATE
Robert Holroyd Stanley, Stockton-on-Tees, and Leslie
John Lawrence Nunthorpe, Middlesbrough, England,
assignors to British Titan Products Company Limited,
Durham, England, a corporation of Great Britain
No Drawing. Filed July 26, 1962, Ser. No. 212,740
Claims priority, application Great Britain, Aug. 3, 1961,
28,312/61
11 Claims. (Cl. 260—429.5)

The present invention relates to a process for the production of tetramethyl titanate.

Tetramethyl titanate, unlike other tetraalkyl titanates, which are generally liquid at ordinary temperatures, is a white solid of low solubility in common organic solvents. It is unstable in the presence of water, for example moist air, when it undergoes hydrolysis. These properties cause considerable difficulty in the recovery of tetramethyl titanate in a high state of purity.

Previous methods used in the preparation of tetramethyl titanate include the following:

(a) the reaction of titanium tetrachloride with sodium methoxide to give a reaction mixture containing tetramethyl titanate and sodium chloride;

(b) the reaction between titanium tetrachloride and methanol, followed by neutralisation of the reaction mixture with ammonia to give a product containing tetramethyl titanate and ammonium chloride;

(c) the reaction of titanate tetrachloride with lithium methoxide to give a reaction mixture containing tetramethyl titanate and lithium chloride;

(d) an interchange reaction between an excess of boiling methanol and distilled tetraethyl titanate or distilled tetraisopropyl titanate to give a reaction product containing tetramethyl titanate and either ethanol or propanol.

In reactions (a) or (b) above great difficulty is experienced in the separation of the reaction product in high yield since commonly used solvents cannot be used because of either the low solubility of the product in the solvent, or the danger of the hydrolysis of tetramethyl titanate. For example, in reaction (b) methanol was found to be the only readily available solvent for the extraction of the ammonium chloride, but the solubility of the latter in the methanol was such that approximately 10 litres of methanol were required per mole of tetramethyl titanate; moreover, the large quantities of methanol necessary for the extraction of ammonium chloride would undoubtedly result in the dissolution of some tetramethyl titanate and thus reduce the yield of the latter compound.

With regard to reaction (c) the solubility of lithium chloride in methanol is greater than that of ammonium chloride, but the relatively high cost of lithium methoxide renders this particular preparation economically unattractive.

References to reaction (d) stress the fact that tetramethyl titanate of high purity and in high yield can only be obtained by carrying out the reaction at an elevated temperature and in at least three stages; firstly, the initial reaction of boiling methanol with the tetraalkyl titanate, secondly, distillation to remove from the reaction mixture the excess of methanol and the alcohol formed from the tetraalkyl titanate used and, thirdly, the repeated addition of fresh methanol with continued distillation until complete interchange has taken place. The preparations also employ a purified tetraalkyl titanate. Such processes are described, for example, in JCS p. 2775 (1952) and in JACS 46, p. 258 (1924).

The compound tetramethyl titanate is of use as a catalyst in the esterification of carboxylic acids with monohydric and polyhydric alkanols, particularly in the preparation of unsaturated esters which tend to polymerize in the presence of other esterification catalysts, thus reducing the yield of the monomeric ester. Tetramethyl titanate is also of use as an ester interchange catalyst in the manufacture of higher esters from lower esters and as a catalyst in the manufacture of polyesters.

It is an object of the present invention to provide an improved process for the production of substantially pure tetramethyl titanate in high yield. The invention achieves this by providing a process whereby substantially pure tetramethyl titanate can be produced and recovered in high yield without repeatedly distilling with fresh supplies of methanol. Moreover, this process does not require the use of purified tetraalkyl titanate, for example, redistilled tetraalkyl titanate.

Accordingly, the present invention is a process for the preparation of tetramethyl titanate comprising adding a dry tetraalkyl titanate, wherein each alkyl group contains from 2 to 4 carbon atoms, to dry methanol and thereafter recovering the substantially pure solid tetramethyl titanate precipitated from the reaction mixture.

The process is preferably operated without distilling away from the reaction mixture during the reaction the alkanol produced from the said tetraalkyl titanate. In such a case said alkanol, while not being distilled away from the reaction mixture, may be partly vapourised and condensed back into the reaction mixture; this may occur if the reaction is carried out under reflux.

It is generally preferred to carry out the reaction at a temperature substantially below the boiling point of the alkanol produced from the tetraalkyl titanate, and preferably substantially below the boiling point of the methanol; thus the alkanol produced from the tetraalkyl titanate is not removed from the reaction mixture during the reaction. Suitably, the reaction may be carried out without the application of heat from an external source.

The term tetraalkyl titanate as used herein is defined as excluding tetraisobutyl titanate.

The alkyl groups of the tetraalkyl titanate are conveniently all the same, but the use of mixed alkyl groups in the tetraalkyl titanate is contemplated by the present invention.

It is preferred to use tetraisopropyl titanate as the tetraalkyl titanate. When tetraisopropyl titanate is added to methanol at room temperature or below, there is formed an immediate precipitate of tetramethyl titanate and the product is ultimately obtained in high yield. The yield is improved at lower temperatures, and since the reaction is exothermic it is advantageous to cool the reaction mixture, for example to maintain room temperature or a lower temperature. When isopropyl titanate is added to methanol at elevated temperatures, for example to methanol heated to its boiling point, the precipitation of tetramethyl titanate may be delayed.

Other tetraalkyl titanates which may be used include etraethyl titanate, tetrabutyl titanate, tetra-secondary-butyl titanate, and tetra-tertiary-butyl titanate.

Whereas purified tetraalkyl titanates may be used, high yields of tetramethyl titanate can be obtained by the use of tetraalkyl titanates of lower purity. For example, in the case of tetraisopropyl titanate, one may use tetraisopropyl titanate which has been purified (e.g. by distillation), but one may alternatively use less pure tetraisopropyl titanate. Such less pure tetraisopropyl titanate may be prepared by reacting together isopropanol and titanium tetrachloride, treating the reaction mixture with ammonia to precipitate ammonium chloride, filtering off the latter material, and thereafter distilling off excess isopropanol, preferably under reduced pressure; the concentrate thus produced can then be used in the present process without further purification, (in particular, without fractional distillation under high vacuum, which is a time-consuming procedure).

When tetrabutyl titanates are used it is advisable to effect the reaction or to add the compound to methanol at temperatures below room temperature, for example at about 0°C. or below, in order to obtain the highest yields of tetramethyl titanate.

The tetraalkyl titanate is preferably added to sufficient methanol to provide enough reaction mixture to permit adequate stirring during and after the addition. It is, of course, desirable that an excess of methanol be present to ensure that the reaction goes substantially to completion. For example, one may use a ratio of at least three volumes of methanol to one volume of tetraalkyl titanate, preferably at least five volumes of methanol to one volume of tetraalkyl titanate.

The process, including the recovery of the product, is conveniently carried out under a dry atmosphere in order to prevent hydrolysis.

The substantially pure tetramethyl titanate precipitated from the reaction mixture is conveniently recovered by filtration although other methods, for example centrifuging, can be used if desired.

After separation, the product will normally be dried, for example by heating, e.g. to a temperature of about 35° C., under reduced pressure.

It has been found essential, in order to obtain tetramethyl titanate of high purity by a single stage reaction between methanol and the tetraalkyl titanate, to add the dry tetraalkyl titanate to the dry methanol, thus ensuring that an excess of methanol is always present. It is preferred to introduce the tetraalkyl titanate into the methanol in the form of small drops and over a substantial period; such period may be, for example, at least 10 minutes and is preferably at least 30 minutes. Good mixing is ensured by vigorous agitation of the reaction mixture during the addition.

After the recovery of tetramethyl titanate the remaining liquid which contains excess methanol and the alcohol derived from the alkyl groups of the tetraalkyl titanate, for example isopropanol from tetraisopropyl titanate, may be fractionally distilled to separate and recover these alcohols.

The following examples describe various methods of carrying out the present invention.

*Example 1*

Dry tetraisopropyl titanate was prepared by reacting together dry titanium tetrachloride and an excess of dry isopropanol and thereafter introducing ammonia until no more ammonium chloride was precipitated. The reaction and neutralization stages were exothermic and cooling was applied to the reaction mixture to prevent an excessive rise in temperature. The ammonium chloride was filtered off and the filtrate was concentrated under reduced pressure.

25 ml. of the concentrate containing tetraisopropyl titanate were added over a period of 30 minutes to 125 ml. of dry methanol which was vigorously stirred. The addition was carried out at room temperature under an atmosphere of dry nitrogen. The temperature during the addition rose by about 8° C.

The fine white precipitate which formed was filtered off under an atmosphere of dry nitrogen and methanol and isopropanol were removed under reduced pressure which was applied to the filter cake for about 160 minutes.

The dried precipitate (14.8 g.) had an elementary analysis of Ti, 28.0%; C, 28.0%; and H, 6.9% and it represented a yield of 98%. (Theory requires Ti, 27.9%; C, 27.9% and H, 7.0%.)

*Example 2*

Tetra-n-butyl titanate concentrate was prepared by the method described in Example 1 for tetraisopropyl titanate except that n-butanol was used in place of isopropanol.

A portion of the concentrate (30 ml.) was added with vigorous stirring to 125 ml. of dry methanol without the application of heat.

A precipitate of tetramethyl titanate formed during the addition and the quantity increased on standing.

Tetramethyl titanate of high purity was recovered in 70% yield.

*Example 3*

Dry tetraisopropyl titanate concentrate (20 litres) prepared as in Example 1 was added with vigorous stirring to 100 litres of dry methanol over a period of 60 minutes in a reaction vessel which had been purged with dry nitrogen to remove water vapour. The reaction mixture was cooled to prevent a rise of temperature during the addition.

Tetramethyl titanate was precipitated immediately but the reaction mixture was stirred for 30 minutes after the addition was complete.

The tetramethyl titanate was filtered off, washed with methanol and dried in a heated oven at 35° C. under reduced pressure. A dry atmosphere was maintained above the solid during the filtration and transfer operations.

The product (11.08 kg.) was a fine white free-flowing powder which had a titanium analysis of 27.9%. This represented a yield of 90%.

*Example 4*

Tetra-n-propyl titanate (25 g.) purified by distillation was added in drops with stirring over a period of about 20 minutes to 125 ml. of dry methanol at room temperature under an atmosphere of dry nitrogen. Stirring of the reaction mixture was continued for 10 minutes after the addition was complete.

The precipitate was filtered off under a dry atmosphere washed with 25 ml. methanol and dried at 35° C. for five hours under reduced pressure.

The product (12.6 g.) was a fine white free-flowing powder having a titanium content of 28.1%. This represented a yield of 82%.

*Example 5*

Dry tetraethyl titanate concentrate (24 ml.) was prepared by the method described in Example 1 for tetraisopropyl titanate except that ethanol was used in place of isopropanol. 24 ml. of the dry tetraethyl titanate concentrate was added to 120 ml. of dry methanol at room temperature over a period of 30 minutes with stirring under an atmosphere of dry nitrogen.

A precipitate formed immediately and was filtered off, washed and dried as described in Example 4.

The quantity recovered (11 g.) represented a 65% yield of tetramethyl titanate of high purity.

*Example 6*

Distilled tetraisopropyl titanate (24 g.) was added dropwise over a period of 30 minutes to 125 ml. of dry methanol boiling under reflux. During the addition the mixture was continuously stirred under dry nitrogen. Stirring was continued for 30 minutes after the addition was complete while the mixture cooled.

Tetramethyl titanate formed as a precipitate immediately the addition commenced and this was filtered off when precipitation was complete and the precipitate was washed with 25 ml. of dry methanol under dry nitrogen. The product was dried at 50° C. under a pressure of 5 mm. Hg for 3 hours to give 14 g. of a fine white powder having the analysis Ti, 27.9%; C, 28.2%; H, 6.5%. This represented a yield of 96.5%.

Example 7

Tetraisopropyl titanate concentrate (100 g.) prepared as described in Example 1 was added over a period of 30 minutes to 300 ml. of well-stirred dry methanol at room temperature under dry nitrogen.

The mixture was stirred for 60 minutes after the completion of the addition and the precipitate of tetramethyl titanate was filtered off; washed with 100 ml. of dry methanol under dry nitrogen and dried under reduced pressure.

The product weighed 45.6 g. and had a titanium content of 27.8%. This represented a yield of 75%.

Example 8

Tetra-secondary-butyl titanate (25.3 g.) was added dropwise to 125 ml. of dry methanol. The addition took place over 15 minutes and the reaction mixture was stirred during this time and for a further 25 minutes after the addition was complete.

An immediate precipitate was formed and when stirring was discontinued the precipitate was filtered off under nitrogen and dried by heating under reduced pressure in an inert atmosphere.

The product was a white free-flowing powder weighing 8.6 grams and having a titanium content of 28.4%. This represented a yield of tetramethyl titanate of 68%.

Example 9

Tertiary-butyl titanate (25.3 g.) was added to 125 ml. of dry methanol over a period of 15 minutes. During the addition and for an additional period of 15 minutes the mixture was stirred.

A precipitate formed immediately the addition commenced and when stirring was discontinued the precipitate was filtered under nitrogen and dried by heating under reduced pressure in an inert atmosphere.

The product was a white free-flowing powder weighing 9.6 g. and having a titanium content of 28.9%. This represented a yield of tetramethyl titanate of 75%.

What is claimed is:

1. A process for the preparation of tetramethyl titanate comprising the steps of:
   (a) adding a dry tetraalkyl titanate selected from the group consisting of tetraethyl titanate, tetrapropyl titanates, tetra-n-butyl titanate, tetra-secondary-butyl titanate and tetra-tertiary-butyl titanate to dry methanol whereby said selected tetraalkyl titanate and said methanol react to form a reaction product alkanol and a solid tetramethyl titanate which precipitates from the reaction mixture;
   (b) maintaining said methanol throughout said addition in excess of the stoichiometric amount and sufficient to provide enough reaction mixture to permit adequate stirring; and
   (c) recovering said solid tetramethyl titanate from the reaction mixture.

2. A process in accordance with claim 1 in which the selected tetraalkyl titanate is tetraisopropyl titanate.

3. A process in accordance with claim 1 wherein said selected tetraalkyl titanate is added to at least three times its volume of dry methanol.

4. A process in accordance with claim 3 in which substantially all of the reaction product alkanol is retained in the reaction mixture during the reaction of the selected tetraalkyl titanate and methanol.

5. A process in accordance with claim 1 in which said reaction mixture is maintained at a temperature substantially below the boiling point of the reaction product alkanol during the reaction of said selected tetraalkyl titanate and said methanol.

6. A process in accordance with claim 5 in which the temperature of the reaction mixture is maintained substantially below the boiling point of methanol.

7. A process in accordance with claim 3 in which the reaction mixture is maintained at a temperature up to about room temperature during said reaction.

8. A process in accordance with claim 7 in which said reaction mixture is maintained at a temperature not higher than about 0° C. during said reaction.

9. A process in accordance with claim 7 in which said selected tetraalkyl titanate is tetraisopropyl titanate.

10. A process in accordance with claim 1 wherein said selected tetraalkyl titanate is added to at least five times its volume of dry methanol.

11. A process for the production of tetramethyl titanate comprising the steps of:
   (a) adding dry tetraisopropyl titanate to at least five times its volume of dry methanol whereby said methanol and said titanate react to form isopropanol and solid tetramethyl titanate which precipitates from the reaction mixture;
   (b) maintaining said reaction mixture at a temperature not higher than about 0° C. during said reaction;
   (c) maintaining substantially all of said isopropanol in said reaction mixture during said reaction; and
   (d) filtering said reaction mixture to recover said solid tetramethyl titanate.

References Cited by the Examiner

UNITED STATES PATENTS 2,689,858   9/1954   Boyd _____ 260—429.5

OTHER REFERENCES

Bradley et al., J. Chem. Soc. (London), pp. 2773–2778, QD–1–C6 (1952).

Varma et al., J. Chem. Soc. (London), pp. 2966–2969 (1960).

TOBIAS E. LEVOW, *Primary Examiner.*

W. J. VAN BALEN, H. M. S. SNEED,
*Assistant Examiners.*